United States Patent

Reynolds et al.

[11] Patent Number: 5,226,338
[45] Date of Patent: Jul. 13, 1993

[54] VEHICLE COMPOUND CHANGE GEAR TRANSMISSION

[75] Inventors: Joseph D. Reynolds, Climax; Alan C. Stine; David O. Thompson, both of Kalamazoo, all of Mich.

[73] Assignee: Eaton Corporation, Cleveland, Ohio

[21] Appl. No.: 909,374

[22] Filed: Jul. 6, 1992

[51] Int. Cl.⁵ ............................................. F16H 3/083
[52] U.S. Cl. .................................. 74/333; 74/356; 74/363
[58] Field of Search ................. 74/333, 342, 343, 356, 74/362, 363, 369, 370

[56] References Cited

U.S. PATENT DOCUMENTS

| | | | |
|---|---|---|---|
| 1,955,656 | 4/1934 | Riley | 74/343 |
| 3,150,530 | 9/1964 | Pittman et al. | 74/333 |
| 3,611,832 | 10/1971 | Vollmer | 74/363 X |
| 3,788,164 | 1/1974 | Ojima | 74/333 X |
| 4,423,643 | 1/1984 | McNamara | 74/331 |
| 4,949,589 | 8/1990 | Reynolds | 74/363 |
| 5,000,060 | 3/1991 | Reynolds et al. | 74/745 |

FOREIGN PATENT DOCUMENTS 690971  4/1953  United Kingdom ............... 74/342

Primary Examiner—Richard M. Lorence
Assistant Examiner—Khui Q. Ta
Attorney, Agent, or Firm—A. E. Chrow

[57] ABSTRACT

A vehicle compound change gear transmission is provided that features an auxiliary drive gear (24) carried by a mainshaft (20) having enhanced freedom of radial movement by eliminating all radial contact between a bearing member that resiliently supports mainshaft (20) for rotation relative to a stationary housing of the transmission by utilizing prescribed spacer member combinations.

6 Claims, 2 Drawing Sheets

VEHICLE COMPOUND CHANGE GEAR TRANSMISSION

INTRODUCTION

This invention relates generally to a vehicular compound change gear transmission having a floating rotary main section shaft in substantial axial alignment with a rotary auxiliary section shaft that is selectively clutchable to the main section shaft through an auxiliary drive gear secrured to the main section shaft and more particularly to an improved vehicle compound change gear transmission wherein radial movement of the auxiliary drive gear is enhanced by eliminating radial contact presently existing between the auxiliary gear and a bearing assembly heretofore supporting both the main section shaft and the auxiliary drive gear for rotation.

BACKGROUND OF THE INVENTION

Compound change gear transmissions are well known in the heavy duty truck field as they are employed to provide a greater number of gear ratio selections that are essential to the operation of heavy duty trucks particularly in mountainous terrain.

Such compound change gear transmissions generally feature a main section having a rotary mainshaft and a plurality of selectable gear ratios to which is added in auxiliary section having a rotary auxiliary shaft that is in substantial axial alignment with the mainshaft and provides an additional number of selectable gear ratios and which is selectively clutchable to the mainshaft through an auxiliary drive gear that is mounted near an end of the mainshaft adjacent an end of the auxiliary shaft. More particularly, for what is known in the trade as 2×2 compound transmissions, the auxiliary gear rotates about the mainshaft and is clutchable thereto by means of clutch assembly that is splined to the mainshaft. For 2-speed type compound transmissions the auxiliary gear is splined for rotation with the mainshaft and the clutch assembly is splined to the auxiliary shaft.

Vehicular compound change gear transmissions of the type herein concerned are disclosed for example in U.S. Pat. Nos. 4,944,197 and 5,000,060, the disclosures of which are incorporated herein by reference and both of which are assigned to the assignee of the present invention.

More particularly, the compound gear change transmission of the type herein concerned features an auxiliary drive gear that either rotates freely about the mainshaft or is secured to the mainshaft for rotation therewith and has a hub that extends coaxially through the inner race of a bearing assembly that provides rotational support for the mainshaft is provided with sufficient clearance to enable the mainshaft to float at least to the degree required to enable smooth engagement between the mainshaft and auxiliary shaft gears.

Whereas a portion of the auxiliary drive gear has heretofore been disposed between the bearing assembly and the mainshaft and has thus had its radial movement limited to the radial movement associated with the floating mainshaft, the present invention provides various combinations of spacers that enable the elimination of all radial contact between the auxiliary drive gear and the bearing assembly such that the clutchability of the auxiliary drive gear is advantageously enhanced due to the increased degree of radial movement established between the auxiliary drive gear and the mainshaft.

SUMMARY OF THE INVENTION

Accordingly, it is an object of this invention to provide an improved vehicular compound change gear transmission.

It is another object of this invention to provide a vehicular compound change gear transmission having a mainshaft auxiliary drive gear that is selectively clutchable to the mainshaft and is provided with advantageously increased freedom of radial movement therebetween.

DESCRIPTION OF SOME PREFERRED EMBODIMENTS

Figure 1:
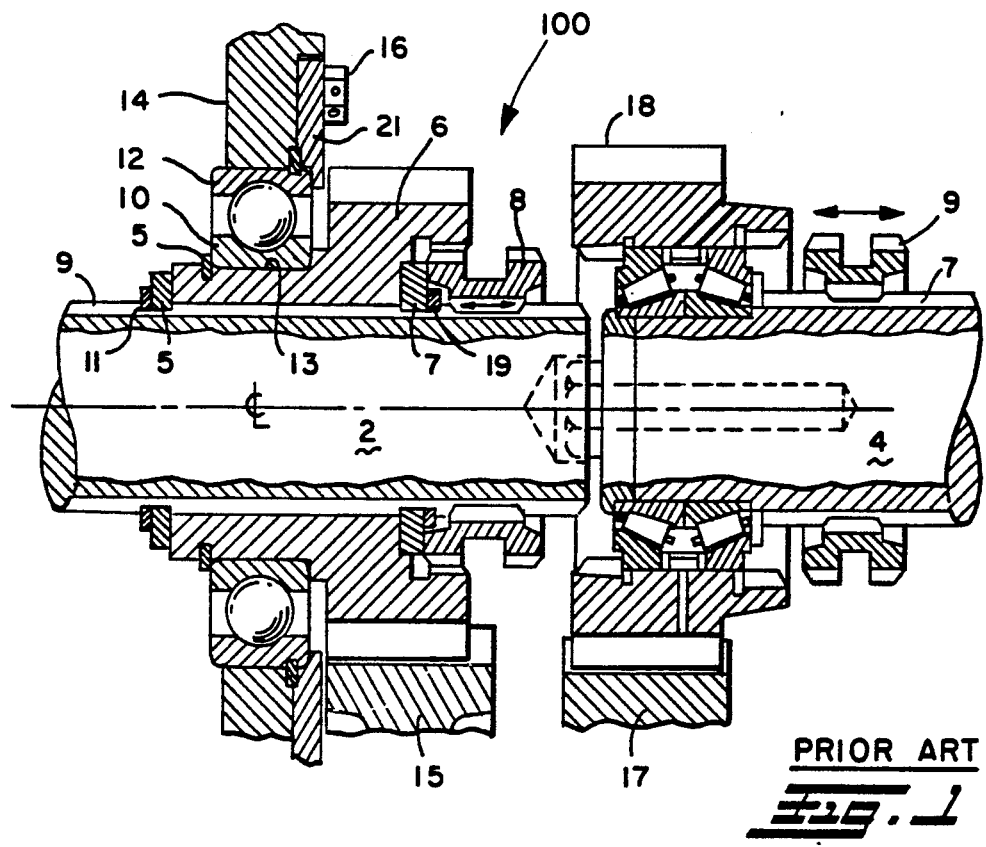
FIG. 1 is a partially sectioned central cross-sectional view of a prior art type compound change gear transmission (100)

Compound change gear transmission 100 of FIG. 1 is a prior art transmission of the 2×2 type in which a rotary main section shaft 2 is journaled for rotation on a stationary transmission housing 14 and has an auxiliary drive gear 6 that rotates freely about mainshaft 2 near an end mainshaft 2 adjacent to an end of rotary auxiliary shaft 4 that is in substantial axial alignment with mainshaft 2.

Mainshaft 2 has a splined outer surface comprising a plurality of circumferentially spaced-apart splines that respectively extend axially along mainshaft 2 in substantial parallel relationship to each other and of which only one is referenced by numeral 9 in FIG. 1.

Auxiliary gear 6 is selectively clutchable to mainshaft 2 by clutch assembly 8 that is in splined engagement with splines 9 of mainshaft 2 and is axially movable in opposite directions therealong as shown by the arrows by means of a shift arm (not shown).

Auxiliary section shaft 4 is substantially axially aligned with mainshaft 2 and carries change gear 18 that rotates freely about shaft 4 unless selectively clutched thereto by forward axial movement of clutch assembly 9 that is in splined engagement with splines 7 axially movable by means of a shift arm (not shown). Change gear 18 has teeth that meshingly engage with the teeth of countershaft change gear 17 mounted on a countershaft (not shown). Gear 17 rotates gear 18 which in turn rotates auxiliary shaft 4 when gear 18 is clutched thereto by clutch assembly 9.

When clutched to mainshaft 2, auxiliary drive gear 6 drives auxiliary change gear 15 that is mounted on the same countershaft upon which gear 17 is mounted.

The arrangement heretofore described involving auxiliary drive gear 6, countershaft gears 15 and 17, auxiliary change gear 18 and clutch assemblies 8 and 9 enable a variety of drive connections between mainshaft 2 and auxiliary shaft 4 through change gears mounted on the countershaft depending upon the relative axial position of clutch assemblies 8 and 9 keeping in mind that the countershaft typically carries more than the two countershaft gears 15 and 17 shown in FIG. 1.

Auxiliary drive gear 6 has a hub having an annular radially outwardly facing surface 13 that is in contacting engagement with inner race 10 of a bearing assembly that rotationally supports mainshaft 2 through auxiliary gear 6. Outer race 12 of the bearing assembly is mounted on stationary housing 14 of the transmission and is held axially by means of a threaded fastener 16 and locking plate 21 in combination with with a snap ring as shown in FIG. 1.

As previously described, mainshaft 2 is able to float relative one or more countershafts by providing a predetermined clearance between mainshaft 2 and inner race 10 of the bearing assembly.

Auxiliary gear 6 is prevented from moving in opposite axial directions by means of transverse thrust rings 5 and 7 that are splined to mainshaft 2 in respective abutting engagement with opposite ends of auxiliary gear 6 and held against gear 6 by retainment rings 11 and 19 respectively that are contained in transverse annular grooves in the outer surface of mainshaft 2 that are not referenced by a numeral in FIG. 1.

Since auxiliary gear 6 has a radially outwardly facing surface in contacting engagement with a bearing assembly that is held in position by a stationary housing, radial movement of auxiliary gear 6 is limited to radial movement associated with the float of the mainshaft as previously described.

Figure 2:
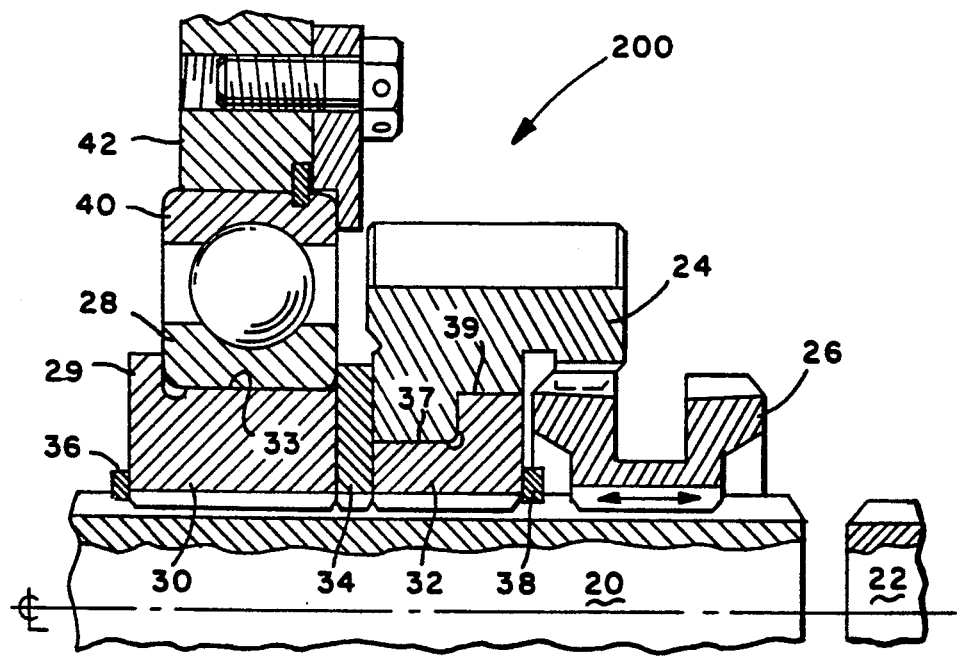
FIG. 2 is a partially sectioned central cross-sectional view of a compound transmission (200) of the invention.

Compound change gear transmission 200 of FIG. 2 is a preferred embodiment of the invention where an auxiliary drive gear 24 is not engaged radially inwardly by the bearing assembly that resiliently rotationally supports floating mainshaft 20 and thus is provided with even greater freedom of radial movement relative the mainshaft.

Inner race 28 of the bearing assembly engages an annular radially outwardly facing surface 33 of a first spacer member 30 that is secured for rotation with mainshaft 20 commonly by splines (not referenced).

Outer race 40 of the bearing assembly is mounted on stationary housing 42 so that the bearing assembly rotationally supports mainshaft 20.

Spacer member 30 has a shoulder 29 that extends radially outwardly to provide an annular surface, (not referenced), that engages an annular surface (not referenced) of inner race 28 facing axially away from auxiliary shaft 22 to prevent inner race 28 from moving axially away therefrom.

A second spacer member 32 is secured by splines or the like to mainshaft 20 between first spacer member 30 and auxiliary shaft 22. A radially outwardly face annular surface 37 of spacer member 32 about which auxiliary gear 24 freely rotates until selectively clutched to mainshaft 20 by clutch assembly 26 that is splined to mainshaft 20 and is movable in opposite axial directions therealong by a shift arm (not shown). Spacer member 32 includes a radially extending shoulder 39 that is operative to engage an annular surface of gear 24 facing towards auxiliary shaft 22 and is operative to prevent gear 24 from moving axially theretoward.

Figure 3:
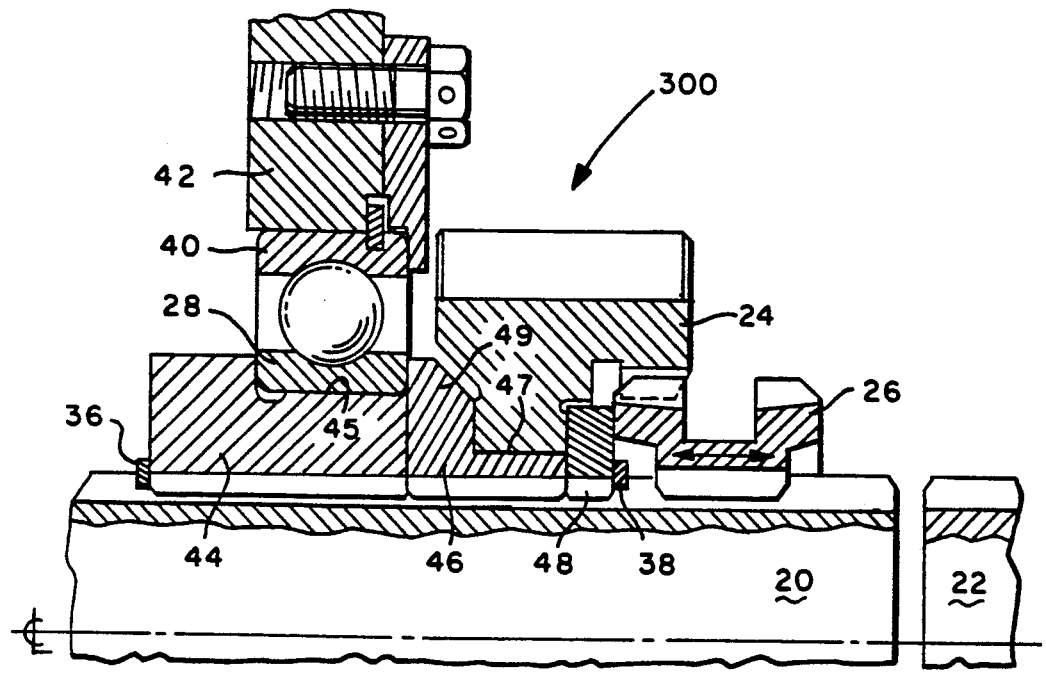
FIG. 3 is a partially sectioned central cross-sectional view of a compound transmission (300) of the invention.

Compound change gear transmission 300 of FIG. 3 is another preferred embodiment of the invention in which radial movement of auxiliary gear 24 is enhanced by eliminating radial contact between gear 24 and the bearing assembly supporting floating mainshaft 20 for rotation.

A first spacer member 44 is secured by splines or the like to mainshaft 20 for rotation therewith. Spacer member 44 has an annular radially outwardly facing surface 45 that is in contacting engagement with inner race 28 of a bearing assembly that has its outer race 40 mounted on stationary housing 42 and thus supports mainshaft 20 for rotation therewith through spacer member 44.

A second spacer member 46 has an annular radially outwardly facing surfacing 47 upon which auxiliary drive gear 24 freely rotates. Auxiliary gear 24 rotates when clutched to mainshaft 20 by clutch assembly 26 that is in splined securement to mainshaft 20.

Spacer member 46 has a shoulder 49 that extends radially outwardly between annular facing surfaces of spacer member 44 and inner race 28 on the one side and auxiliary gear 24 on the opposite side and is operative to prevent auxiliary gear 24 from contacting the bearing assembly.

A thrust spacer member 48 is secured to mainshaft 20 by splines or the like between second spacer member 46 and auxiliary shaft 22 to which mainshaft 20 is selectively clutchable by means of clutch assembly 26. The side of spacer member 48 facing axially away from auxiliary shaft 22 is in abutting engagement with annular facing surfaces on spacer member 46 and auxiliary drive gear 24 and all of spacer members 44, 46 and 48 are held snugly together between retaining rings 36 and 38 that extend radially outwardly from transverse annular grooves in the outer surface of mainshaft 20 (not shown) that operate to prevent spacer members 44, 46, and 48 from moving axially in opposite directions along mainshaft 20.

Figure 4:
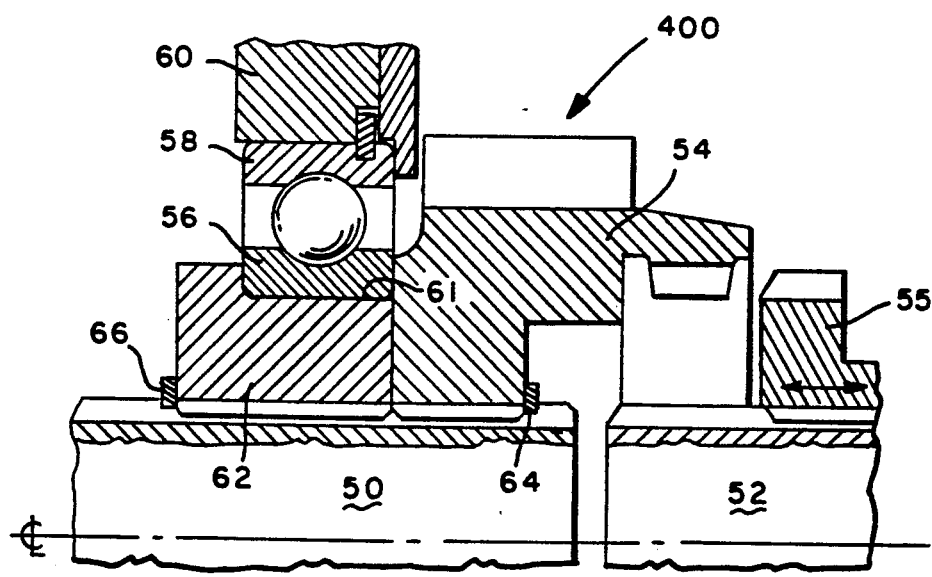
FIG. 4 is a partially sectioned central cross-sectional view of a compound transmission (400) of the invention.

Another preferred embodiment of the invention is shown in FIG. 4 in the form of a compound change gear transmission 400 of the previously described 2 speed type having a rotary main section shaft 50 that is selectively clutchable to a rotary auxiliary section shaft 52 that carries the clutching assembly 55 rather than the mainshaft 50. In this instance, a singular spacer member 62 is secured to mainshaft 50 by splines or the like for rotation therewith and has an annular radially outwardly facing surface 61 that is in contacting engagement with inner race 56 of the mainshaft bearing assembly having an outer race 58 that is mounted on stationary housing 60 of the transmission. As such, mainshaft 50 is rotationally supported by the bearing assembly through spacer member 62 and mainshaft 50 is able to float radially within prescribed limits as previously described.

Auxiliary drive gear 54 is secured by splines or the like to mainshaft 52 and is held in abutting engagement with spacer member 62 by means of retaining rings 64 and 65 that extend radially outwardly from transverse grooves in the outer surface of mainshaft 50 (not shown).

Like compound change gear transmissions 200 and 300 of FIGS. 2 and 3 respectively, the auxiliary drive gear of transmission 400 has no radial contact with the bearing assembly rotationally supporting the mainshaft.

What is claimed is:

1. An improved compound change gear transmission of the type having a floating rotary mainshaft disposed in substantial axial alignment with a rotary auxiliary shaft and carries an auxiliary drive gear and a bearing assembly that supports the mainshaft for rotation relative to a stationary housing of the transmission, wherein the improvement comprises said auxiliary drive gear having enhanced radial movement by eliminating radial contact between auxiliary drive gear and the bearing assembly as a result of the bearing assembly and the auxiliary drive gear being mounted on the mainshaft such that the auxiliary drive gear is selectively clutchable to the auxiliary shaft by a clutch assembly carried by the auxiliary shaft and an inner race of said bearing assembly surrounds and is in contacting engagement with an annular radially outwardly facing surface of a spacer member that is secured to the mainshaft for rotation therewith and has an annular surface facing axially towards the auxiliary shaft and is operative to prevent the bearing assembly inner race from moving axially away therefrom, the auxiliary drive gear is secured to the mainshaft and has an annular surface facing away therefrom that is in abutting axial engagement with respective annular surfaces of the spacer member and bearing assembly inner race facing theretoward, and means are provided for preventing the spacer member and the auxiliary drive gear from moving axially along the mainshaft.

2. An improved compound change gear transmission of the type having a floating rotary mainshaft disposed in substantial axial alignment with a rotary auxiliary shaft and carries an auxiliary drive gear a bearing assembly that supports the mainshaft for rotation relative a stationary housing of the transmission, wherein the improvement comprises said auxiliary drive gear having enhanced radial movement by eliminating radial contact between the auxiliary drive gear and the bearing assembly as a result of the bearing assembly and the auxiliary drive gear being mounted on the mainshaft such that the auxiliary drive gear is selectively clutchable to the mainshaft and an inner race of said bearing assembly surrounds and is in contacting engagement with an annular radially outwardly facing surface of a first spacer member that is secured to the mainshaft for rotation therewith and has a radially outwardly extending shoulder having an annular surface facing towards the auxiliary shaft operative to prevent the bearing inner race from moving axially away therefrom, the auxiliary drive gear surrounds and is rotatable with respect to an annular radially outwardly facing surface of a second spacer member that is secured to the mainshaft for rotation therewith between the first spacer member and the auxiliary shaft and has a radially outwardly extending shoulder having an annular surface operative to engage an annular surface on the auxiliary drive gear facing toward the auxiliary shaft and operative to prevent the auxiliary drive gear from moving theretoward, a third spacer member is secured to the mainshaft for rotation therewith between the bearing assembly inner race and the first spacer member on one side and the auxiliary drive gear and the second spacer member on the opposite side and is in abutting axial engagement with respective annular facing surfaces thereof, and means are provided for preventing the first, second and third spacer members from moving axially along the mainshaft.

3. An improved compound change gear transmission of the type having a floating rotary mainshaft disposed in substantial axial alignment with a rotary auxiliary shaft and carries an auxiliary drive gear a bearing assembly that supports the mainshaft for rotation relative a stationary housing the transmission, wherein the improvement comprises said auxiliary drive gear having enhanced radial movement by eliminating radial contact between the auxiliary drive gear and the bearing assembly as a result of the bearing assembly and the auxiliary drive gear being mounted on the mainshaft such that the auxiliary drive gear is selectively clutchable to the mainshaft by a clutch assembly carried by the mainshaft and inner race of said bearing assembly surrounds and is in contacting engagement with an annular radially outwardly facing surface of a first spacer member that is secured to the mainshaft for rotation therewith and has an annular surface facing towards the auxiliary shaft operative to prevent the bearing assembly inner race from moving axially away therefrom, the auxiliary drive gear surrounds and is rotatable relative to an annular radially outwardly facing surface of a second spacer member that is secured to the mainshaft for rotation therewith between the first spacer member and the auxiliary shaft and has a shoulder that extends radially outwardly between the bearing assembly inner race and the first spacer member on one side and the auxiliary drive gear on the opposite side and is in abutting axial engagement with respective annular facing surfaces thereof, a third spacer member is secured to the mainshaft for rotation therewith between the second spacer member and the auxiliary shaft and is in abutting engagement with respective annular surfaces of the auxiliary drive gear and the second spacer member facing theretowards, and means are provided for preventing the first, second and third spacer members from moving axially along the mainshaft.

4. The transmission of claim 1 wherein the means for preventing the auxiliary drive gear and the spacer member from moving axially is provided by said gear and said spacer member being contained axially between a pair of retaining rings respectively disposed in transverse annular grooves in the outer surface of the mainshaft.

5. The transmission of claim 2 wherein the means for preventing the first, second and third spacer members from moving axially is provided by said first, second and third spacer members being contained axially between a pair of retaining rings respectively disposed in transverse annular grooves in the outer surface of the mainshaft.

6. The transmission of claim 3 wherein the means for preventing the first, second and third spacer members from moving axially is provided by said first, second and third spacer members being contained axially between a pair of retaining rings respectively disposed in transverse annular grooves in the outer surface of the mainshaft.

* * * * *